United States Patent
Kim et al.

(10) Patent No.: US 10,014,543 B2
(45) Date of Patent: Jul. 3, 2018

(54) INORGANIC OXIDE POWDER AND ELECTROLYTE COMPRISING SINTERED BODY OF THE SAME

(71) Applicant: LG CHEM, LTD., Seoul (KR)

(72) Inventors: Jong Woo Kim, Daejeon (KR); Changseok Ryoo, Daejeon (KR); Kwangwook Choi, Daejeon (KR); Gyunjoong Kim, Daejeon (KR); Jongjin Lee, Daejeon (KR); Takkeun Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 200 days.

(21) Appl. No.: 14/907,662

(22) PCT Filed: Jul. 29, 2014

(86) PCT No.: PCT/KR2014/006915
§ 371 (c)(1),
(2) Date: Jan. 26, 2016

(87) PCT Pub. No.: WO2015/016565
PCT Pub. Date: Feb. 5, 2015

(65) Prior Publication Data
US 2016/0181645 A1    Jun. 23, 2016

(30) Foreign Application Priority Data

Aug. 1, 2013   (KR) .................. 10-2013-0091785
Jul. 8, 2014   (KR) .................. 10-2014-0085298

(51) Int. Cl.
  H01M 8/1246    (2016.01)
  H01M 8/1004    (2016.01)
  (Continued)

(52) U.S. Cl.
  CPC .......... *H01M 8/1246* (2013.01); *H01M 8/126* (2013.01); *H01M 8/1253* (2013.01);
  (Continued)

(58) Field of Classification Search
  CPC .. H01M 8/1246; H01M 8/1253; H01M 8/126; H01M 8/1266; H01M 2008/1293;
  (Continued)

(56) References Cited

U.S. PATENT DOCUMENTS 8,647,771 B2   2/2014   Lee et al.
8,758,455 B2   6/2014   Pitteloud et al.
(Continued)

FOREIGN PATENT DOCUMENTS

EP   2012381 A1   1/2009
JP   11-040167 A   2/1999
(Continued)

OTHER PUBLICATIONS

Korean Office Action for Korean Application No. 10-2014-0085298, dated Feb. 25, 2016.
(Continued)

*Primary Examiner* — Muhammad S Siddiquee

(57) ABSTRACT

The present specification provides an inorganic oxide powder and an electrolyte including a sintered body of the same.

12 Claims, 7 Drawing Sheets

(51) Int. Cl.
*H01M 8/1253* (2016.01)
*H01M 8/126* (2016.01)
*H01M 8/124* (2016.01)

(52) U.S. Cl.
CPC .. *H01M 8/1266* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(58) Field of Classification Search
CPC ... H01M 2300/0074; H01M 2300/0077; Y02P 70/56; Y02E 60/525
See application file for complete search history.

(56) References Cited

U.S. PATENT DOCUMENTS

| | | |
|---|---|---|
| 2006/0125157 A1 | 6/2006 | Swartzlander et al. |
| 2008/0299434 A1 | 12/2008 | Katagiri et al. |
| 2009/0011307 A1* | 1/2009 | Lee ............... B82Y 30/00 429/528 |
| 2009/0226725 A1 | 9/2009 | Myeong et al. |
| 2012/0009459 A1 | 1/2012 | Pitteloud et al. |
| 2012/0178015 A1 | 7/2012 | Quek et al. |
| 2013/0146469 A1* | 6/2013 | Budaragin ............ H01B 1/122 205/334 |
| 2014/0227613 A1* | 8/2014 | Yoo ................... B32B 18/00 429/400 |
| 2014/0302420 A1* | 10/2014 | Wachsman ........ H01M 4/9033 429/489 |

FOREIGN PATENT DOCUMENTS

| | | |
|---|---|---|
| JP | 2004-327278 A | 11/2004 |
| JP | 2004-355928 A | 12/2004 |
| JP | 2006-210198 A | 8/2006 |
| JP | 2008-041469 A | 2/2008 |
| JP | 2006-278090 A | 10/2008 |
| JP | 2008-300075 A | 12/2008 |
| JP | 2009-016350 A | 1/2009 |
| JP | 2009-507751 A | 2/2009 |
| JP | 2009-087935 A | 4/2009 |
| JP | 2011-142064 A | 7/2011 |
| KR | 10-2009-0002895 A | 1/2009 |
| KR | 10-2012-0121570 A | 11/2012 |
| WO | WO 2007/029933 A1 | 3/2007 |
| WO | WO 2013/088926 A1 | 6/2013 |

OTHER PUBLICATIONS

International Search Report and Written Opinion for International Patent Application No. PCT/KR2014/006915 dated Nov. 18, 2014.

\* cited by examiner

[FIG. 1]
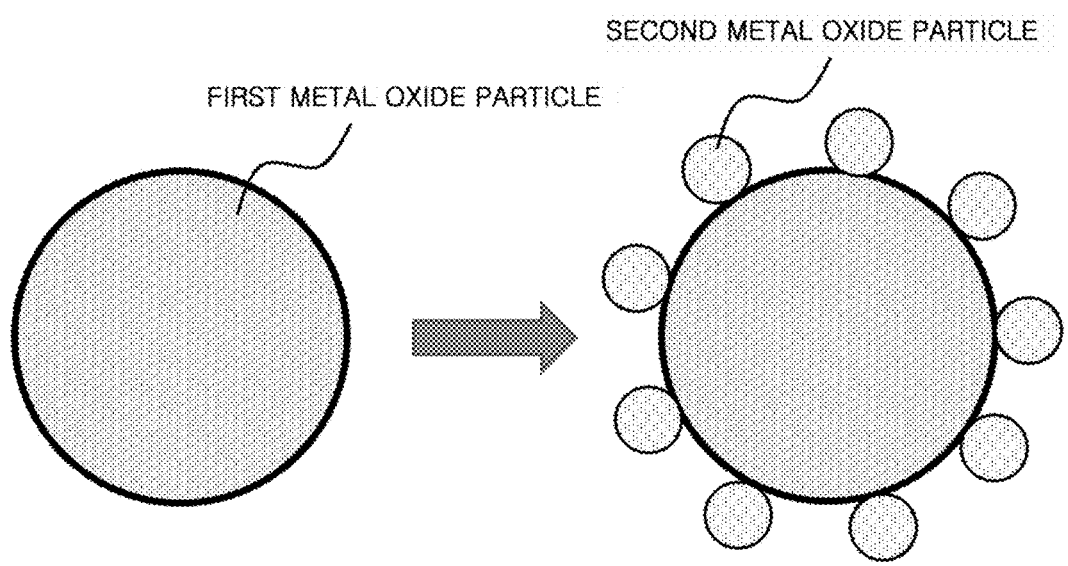

[FIG. 2]
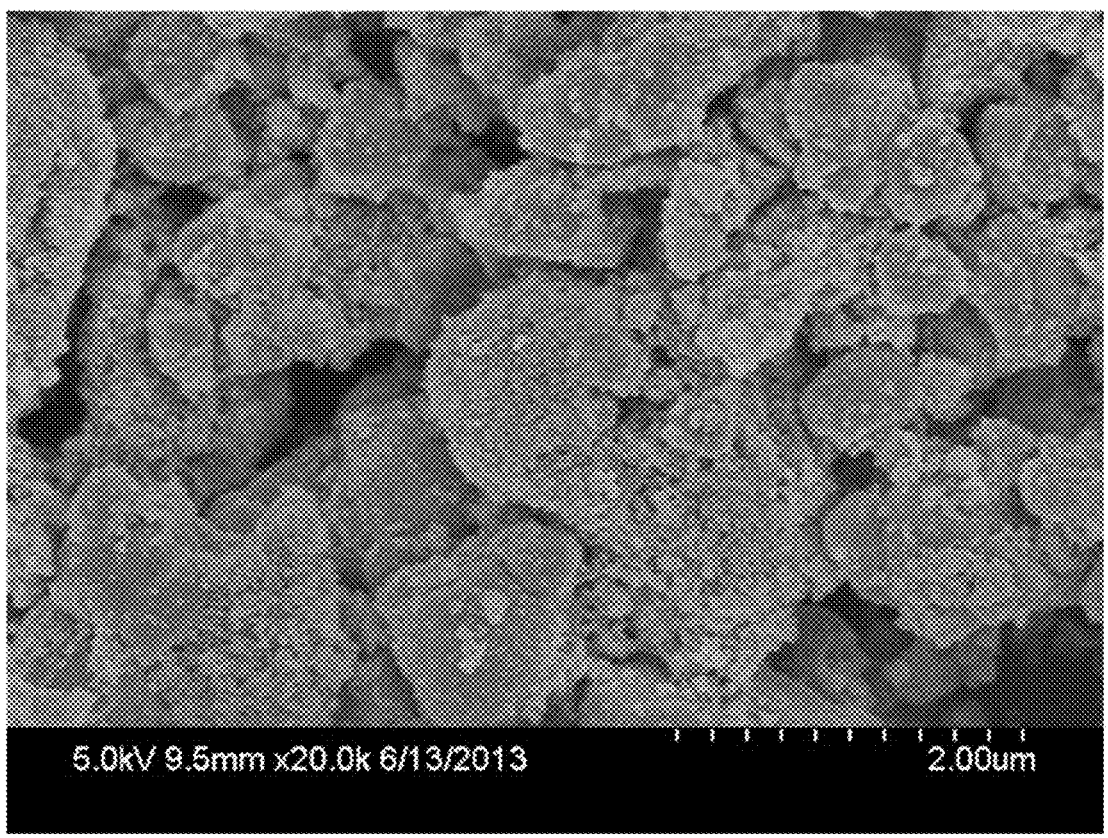

[FIG. 3]
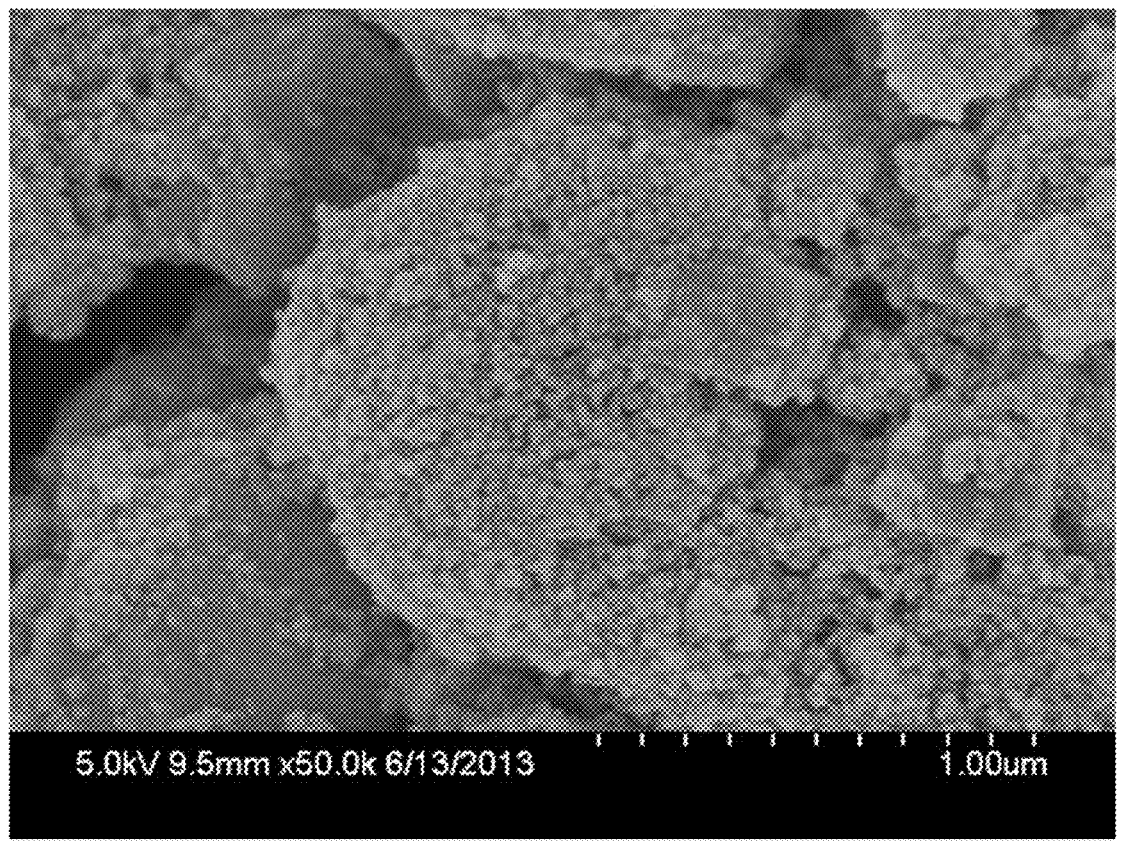

[FIG. 4]
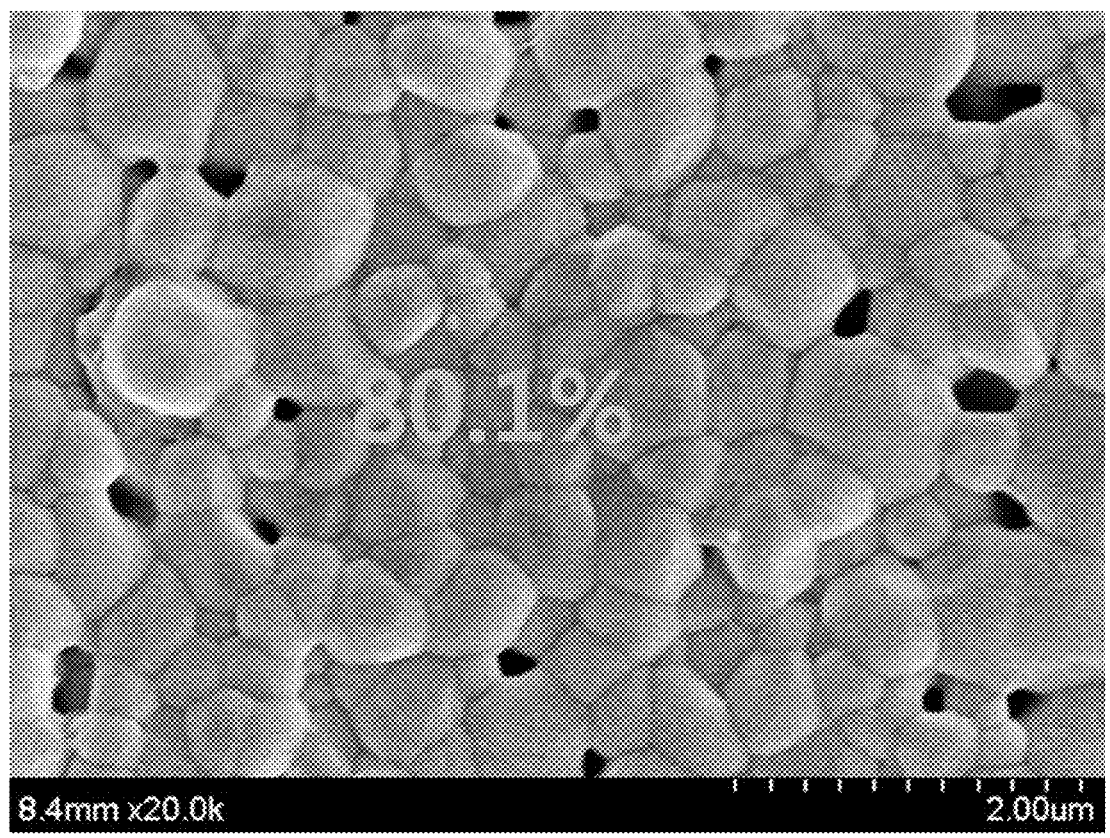

[FIG. 5]
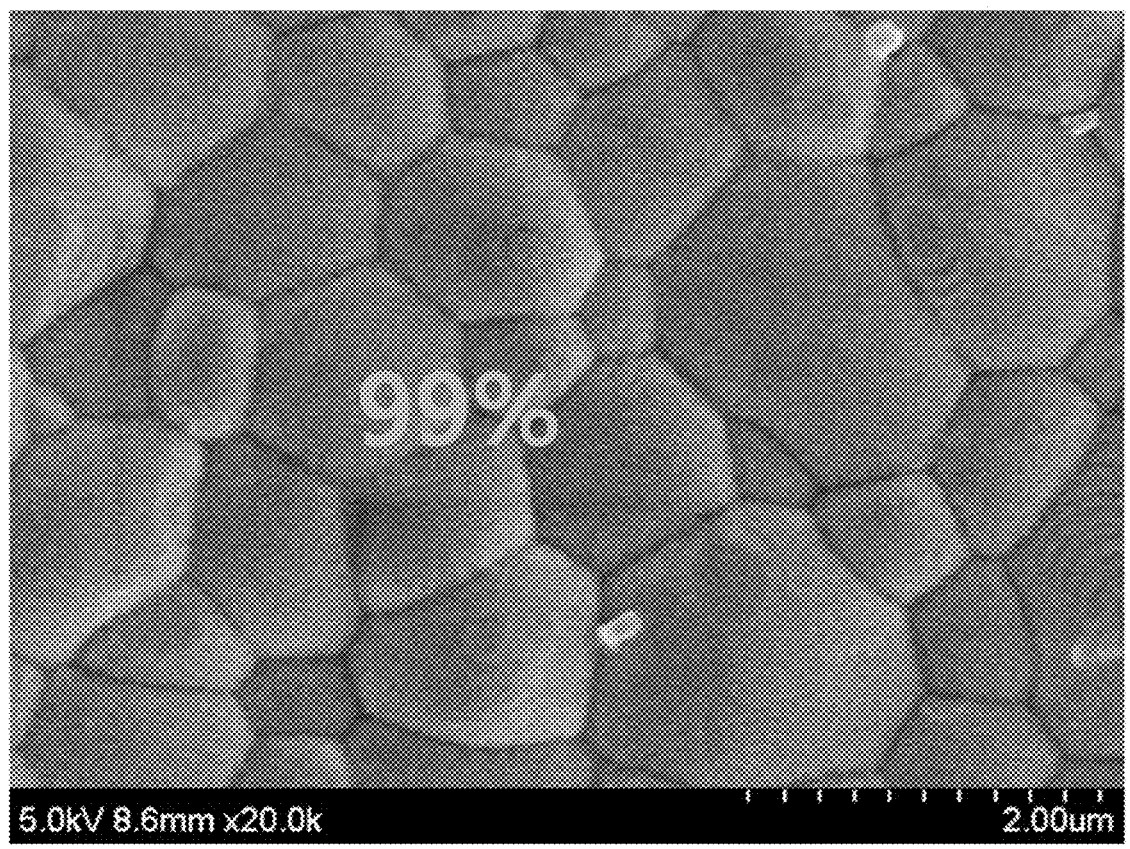

[FIG. 6]
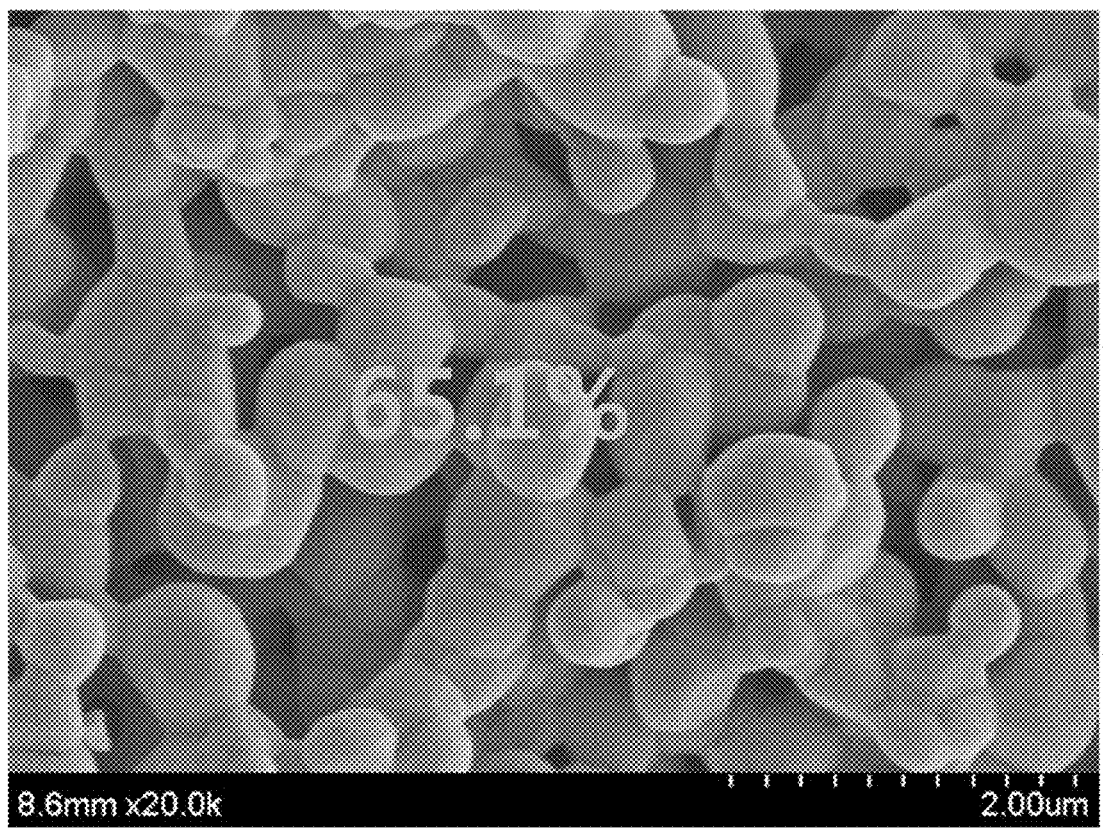

[FIG. 7]
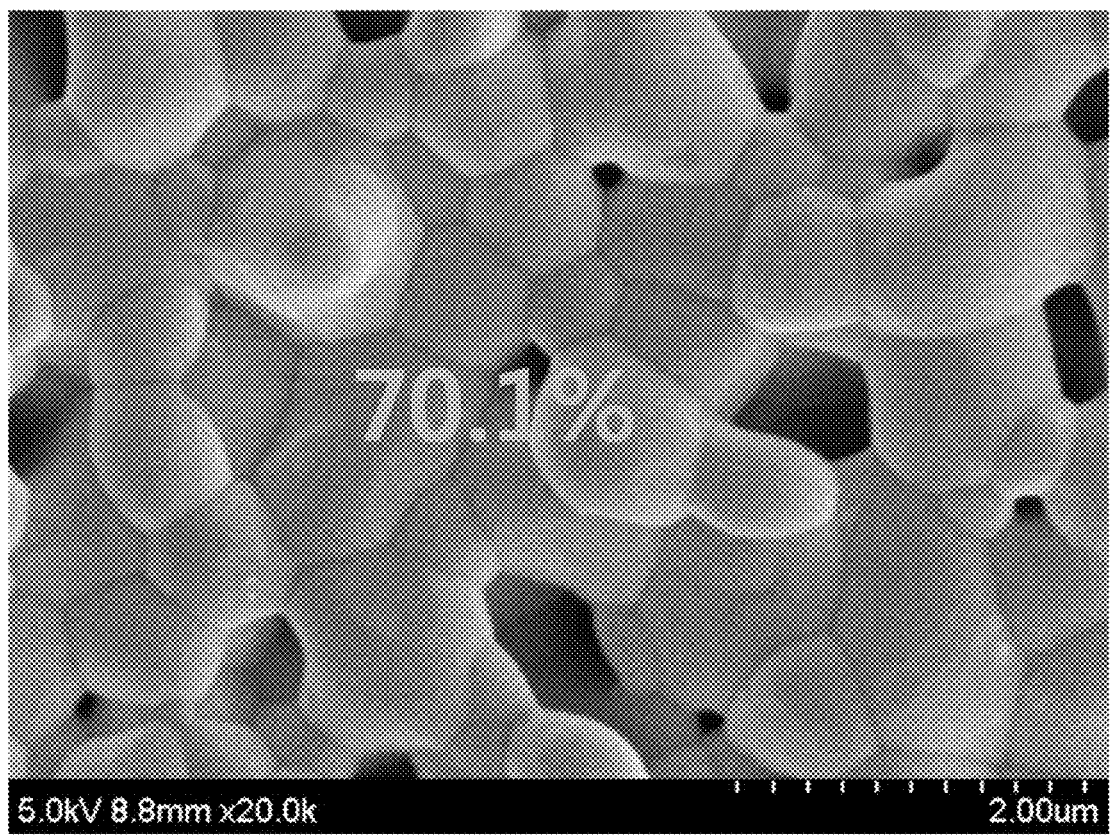

INORGANIC OXIDE POWDER AND ELECTROLYTE COMPRISING SINTERED BODY OF THE SAME

TECHNICAL FIELD

The present specification is a U.S. National Stage of International Patent Application No. PCT/KR2014/006915 filed Jul. 29, 2014, which claims priority to and the benefit of Korean Patent Application Nos. 10-2013-0091785 and 10-2014-0085298 filed in the Korean Intellectual Property Office on Aug. 1, 2013 and Jul. 8, 2014, respectively, the entire contents of which are incorporated herein by reference.

The present specification relates to an inorganic oxide powder and an electrolyte including a sintered body of the same.

BACKGROUND ART

In general, a fuel cell is called as a third-generation battery subsequent to a dry battery which is a first-generation battery and a storage battery which is a second-generation battery, and is a battery for converting chemical energy generated by the oxidation of a fuel directly into electrical energy.

Characteristics of the fuel cell are that reactants may be continuously supplied from the outside, electricity may be semi-permanently produced during the process in which reaction products are continuously removed out of the system, and the energy efficiency is very high because there is no loss generated in the mechanical conversion. Further, the fuel cells use various fuels such as fossil fuel, liquid fuel, and gas fuel, and are also divided into a low temperature type and a high temperature type according to the operating temperature.

Among them, a solid oxide fuel cell is a fuel cell which uses a solid oxide having ion conductivity as an electrolyte, and operates at the highest temperature (600 to 1,000° C.) among the existing fuel cells, has a simple structure compared to other fuel batteries because all the constituent elements are solid, has no problem with the loss, replenishment and corrosion of an electrolyte, and allows fuel to be easily supplied through direct internal reforming without a noble metal catalyst.

In addition, the solid oxide fuel cell also has an advantage in that combined heat and power generation using waste heat may be implemented because high-temperature gas is discharged. Due to these advantages, studies on the solid oxide fuel cell have been actively conducted.

CITATION LIST

Patent Document

Korean Patent Application Laid-Open No. 2012-0076335

DETAILED DESCRIPTION OF THE INVENTION

Technical Problem

The present specification provides an inorganic oxide powder and an electrolyte including a sintered body of the same.

Technical Solution

An exemplary embodiment of the present specification provides an inorganic oxide powder including one or more ion conductive particles including: the ion conductive particles including a first inorganic oxide particle; and at least one second inorganic oxide particle bonded to a surface of the first inorganic oxide particle, in which a particle diameter of the second inorganic oxide particle is 1/10,000 to 1/2 of a particle diameter of the first inorganic oxide particle, and the first inorganic oxide particle and the second inorganic oxide particle each have an oxygen ion conductivity of 0.0001 S/cm to 0.5 S/cm at 800° C.

Another exemplary embodiment of the present specification provides an electrolyte including a sintered body of an inorganic oxide powder including one or more ion conductive particles including: the ion conductive particles including a first inorganic oxide particle; and at least one second inorganic oxide particle bonded to a surface of the first inorganic oxide particle, in which a particle diameter of the second inorganic oxide particle is 1/10,000 to 1/2 of a particle diameter of the first inorganic oxide particle, and the first inorganic oxide particle and the second inorganic oxide particle each have an oxygen ion conductivity of 0.0001 S/cm to 0.5 S/cm at 800° C.

Yet another exemplary embodiment of the present specification provides a solid oxide fuel cell including: an air electrode; a fuel electrode; and the electrolyte provided between the air electrode and the fuel electrode.

Still another exemplary embodiment of the present specification provides a method for producing the inorganic oxide powder, the method including: forming a first inorganic oxide particle; preparing a second inorganic oxide particle; and forming one or more ion conductive particles by binding the second inorganic particle to the first inorganic oxide particle.

Advantageous Effects

A second metal oxide particle in the inorganic oxide powder according to an exemplary embodiment of the present specification enables sintering at a sintering temperature lower than a sintering temperature of a first metal oxide particle, thereby reducing process costs.

The inorganic oxide powder according to an exemplary embodiment of the present specification has an advantage in that the dispersibility is high due to the particle diameter size of the first metal oxide particle.

When an electrolyte is formed by using the inorganic oxide powder according to an exemplary embodiment of the present specification, high density and low porosity may be implemented.

When an electrolyte is formed by using the inorganic oxide powder according to an exemplary embodiment of the present specification, even a sintering temperature of an electrode layer of a solid oxide fuel cell may be lowered. Therefore, a solid oxide fuel cell may be produced by simultaneously sintering electrodes and an electrolyte during the production of the solid oxide fuel cell, and thus the heat treatment processes are integrated into one process, thereby having an advantage in that the process costs are reduced.

Since the inorganic oxide powder according to an exemplary embodiment of the present specification may minimize the shrinkage of particles by sintering due to the low sintering temperature, it is possible suppress distortion at the interface between an electrolyte and an electrode of a solid oxide fuel cell.

BRIEF DESCRIPTION OF DRAWINGS

FIG. 1 illustrates an example of the cross-section of an ion conductive particle included in the inorganic oxide powder according to an exemplary embodiment of the present specification.

FIGS. 2 and 3 illustrate an image of inorganic oxide particles produced according to Example 1.

FIG. 4 illustrates an image of an electrolyte produced according to Example 2.

FIG. 5 illustrates an image of an electrolyte produced according to Example 3.

FIG. 6 illustrates an image of an electrolyte produced according to Comparative Example 1.

FIG. 7 illustrates an image of an electrolyte produced according to Comparative Example 2.

BEST MODE

Hereinafter, the present specification will be described in more detail.

An exemplary embodiment of the present specification provides an inorganic oxide powder including one or more ion conductive particles including: the ion conductive particles including a first inorganic oxide particle; and at least one second inorganic oxide particle bonded to a surface of the first inorganic oxide particle, in which a particle diameter of the second inorganic oxide particle is 1/10,000 to 1/2 of a particle diameter of the first inorganic oxide particle, and the first inorganic oxide particle and the second inorganic oxide particle each have an oxygen ion conductivity of 0.0001 S/cm to 0.5 S/cm.

According to an exemplary embodiment of the present specification, a particle diameter of the second inorganic oxide particle may be 1/5,000 to 1/10 of a particle diameter of the first inorganic oxide particle. Further, according to an exemplary embodiment of the present specification, a particle diameter of the second inorganic oxide particle may be 1/1,000 to 1/20 of a particle diameter of the first inorganic oxide particle.

According to an exemplary embodiment of the present specification, the inorganic oxide powder may be a material for an electrolyte of a solid oxide fuel cell.

In the present specification, the solid oxide fuel cell means a fuel cell which uses a solid oxide which may be permeable to oxygen or hydrogen ions as an electrolyte.

According to an exemplary embodiment of the present specification, the first inorganic oxide particle may have an average particle diameter of 200 nm to 20 μm. Furthermore, according to an exemplary embodiment of the present specification, the first inorganic oxide particle may have an average particle diameter of 500 nm to 20 μm.

Further, according to an exemplary embodiment of the present specification, the second inorganic oxide particle may have an average particle diameter of 1 nm to 500 nm.

The first inorganic oxide particle has a relatively large particle diameter as a particle diameter of the micro size, and thus may improve dispersibility in the slurry or paste during the thick film or thin film deposition process of the inorganic oxide powder. Furthermore, the ion conductive particle may form a compact sintered body due to the first inorganic oxide particle having high crystallinity, and the compactness of the electrolyte may be increased due to the compact sintered body. Furthermore, the ion conductive particle may secure high compactness even though heat treatment is performed at a low temperature due to the second inorganic oxide particle having a particle diameter of the micro size, and may secure low shrinkage due to the low-temperature heat treatment.

Further, the first inorganic oxide particle may improve ion conductivity by greatly controlling the grain boundary. The improved ion conductivity may improve the ion conductivity of an electrolyte including a sintered body of the inorganic oxide powder.

In addition, when an electrolyte of a solid oxide fuel cell is formed by using the inorganic oxide powder, due to the first inorganic oxide particle, the dispersibility in the solution may be improved to facilitate the production process of the electrolyte, and the shrinkage may be controlled to suppress the cell of the fuel cell from being distorted.

The second inorganic oxide particle may facilitate sintering and lower the sintering temperature when an electrolyte is produced by sintering the inorganic oxide powder. Therefore, the inorganic oxide powder may form an electrolyte having high density at a lower temperature, and has an advantage in that it is possible to control the sintering temperature of an electrolyte material to the sintering temperature of another layer such as an electrode layer. Furthermore, due to the electrolyte having a low sintering temperature, it is possible to simplify the heat treatment process through simultaneous sintering with other constituents such as the electrode during the production of the solid oxide fuel cell. Furthermore, it is also possible to improve the ion conductivity by controlling the grain boundary.

According to an exemplary embodiment of the present specification, the inorganic oxide powder may have oxygen ion conductivity because the first inorganic oxide particle and the second inorganic oxide particle have oxygen ion conductivity. Furthermore, when an electrolyte is formed by using the inorganic oxide powder to form a sintered body, the electrolyte also has oxygen ion conductivity. Specifically, the inorganic oxide powder may be sintered at a temperature lower than the sintering temperature of the first inorganic oxide particle.

In general, when the inorganic oxide particle is subjected to heat temperature at a high temperature, a more compact structure may be formed, but costs for maintaining the high temperature are considerable, accompanied by a burden to include an apparatus caused thereby. Therefore, there is a need for studies for being capable of achieving high compactness while the inorganic oxide particle is subjected to heat treatment at a lower temperature.

Thus, the present inventors have invented the inorganic oxide particle which may form a sintered body with a compact structure at a lower temperature. Specifically, the present inventors have found that when an electrolyte membrane is formed by using the inorganic oxide powder, the inorganic oxide powder may be produced at a lower cost, and the sintering temperature may be lowered so that the inorganic oxide powder may be simultaneously sintered simultaneously with other members such as an anode and a cathode.

According to an exemplary embodiment of the present specification, the weight ratio of the first inorganic oxide particle and the second inorganic oxide particle in the inorganic oxide powder may be 1,000:1 to 1:10.

Specifically, according to an exemplary embodiment of the present specification, the second inorganic oxide particle may be bonded to a part or the entirety of the surface of the first inorganic oxide particle. When the content of the second inorganic oxide particle is excessively high, there occurs a phenomenon in which the ion conductive particles are aggregated with each other, so that when an electrolyte is formed by sintering the inorganic oxide particle, there may occur a problem in that the uniformity of the electrolyte greatly deteriorates. In addition, when the content of the second inorganic oxide particle is excessively low, there may occur a problem in that the sintering temperature of the inorganic oxide powder is not lowered to equal to or less than the required level. Therefore, when the weight ratio of the first inorganic oxide particle and the second inorganic oxide particle is within the range, the sintering temperature of the inorganic oxide powder may be sufficiently lowered, and the aggregation phenomenon may be prevented.

Specifically, according to an exemplary embodiment of the present specification, the second inorganic oxide particle may be bonded to 20% to 100% of the surface area of the first inorganic oxide particle. Specifically, according to an exemplary embodiment of the present specification, the second inorganic oxide particle may be bonded to 50% to 100% of the surface area of the first inorganic oxide particle.

According to an exemplary embodiment of the present specification, the ion conductive particle may be included in an amount of 50 wt % to 100 wt % of the total weight of the inorganic oxide powder. Further, according to an exemplary embodiment of the present specification, the inorganic oxide powder includes the ion conductive particle as a main component, and may further include additional additives or impurities.

According to an exemplary embodiment of the present specification, the first inorganic oxide particle and the second inorganic oxide particle may include different compounds or the same compound.

Specifically, according to an exemplary embodiment of the present specification, the first inorganic oxide particle and the second inorganic oxide particle may be the same compound.

According to an exemplary embodiment of the present specification, the first inorganic oxide particle and the second inorganic oxide particle may include one or more compounds selected from the group consisting of zirconia-based compounds; ceria-based compounds; bismuth-based compounds; and lanthanum gallate-based compounds.

According to an exemplary embodiment of the present specification, the first inorganic oxide particle and/or the second inorganic oxide particle each may be a compound of one or two or more selected from the group consisting of zirconia doped with one or more selected from the group consisting of yttrium and scandium; ceria doped with one or more selected from the group consisting of gadolinium, samarium, lanthanum, ytterbium, and neodymium; and lanthanum gallate doped with one or more selected from the group consisting of strontium and magnesium.

According to an exemplary embodiment of the present specification, the first inorganic oxide particle and the second inorganic oxide particle each may include at least one selected from the group consisting of zirconia-based compounds which are undoped or doped with at least one of yttrium, scandium, calcium, and magnesium; ceria-based compounds which are undoped or doped with at least one of gadolinium, samarium, lanthanum, ytterbium, and neodymium; bismuth oxide-based compounds which are undoped or doped with at least one of calcium, strontium, barium, gadolinium, and yttrium; and lanthanum gallate-based compounds which are undoped or doped with at least one of strontium and magnesium.

According to an exemplary embodiment of the present specification, the zirconia-based compound may be $ZrO_2$ doped with one selected from the group consisting of CaO, MgO, $Sc_2O_3$, $ZrO_2$, and $Y_2O_3$.

According to an exemplary embodiment of the present specification, the ceria-based compound may be $CeO_2$ doped with one selected from the group consisting of $Sm_2O_3$, $Gd_2O_3$, $CeO_2$, and $Y_2O_3$.

According to an exemplary embodiment of the present specification, the bismuth-based compound may be $Bi_2O_3$.

According to an exemplary embodiment of the present specification, the lanthanum gallate-based compound may have a perovskite structure. Specifically, the lanthanum gallate-based compound may be $(La, Sr)(Ga, Mg)O_{3-\delta}$ or $Ba(Ce,Gd)O_{3-\delta}$.

An exemplary embodiment of the present specification provides an electrolyte including a sintered body of an inorganic oxide powder including one or more ion conductive particles including: the ion conductive particles including a first inorganic oxide particle; and at least one second inorganic oxide particle bonded to a surface of the first inorganic oxide particle, in which a particle diameter of the second inorganic oxide particle is $1/10,000$ to $1/2$ of a particle diameter of the first inorganic oxide particle, and the first inorganic oxide particle and the second inorganic oxide particle each have an oxygen ion conductivity of 0.0001 S/cm to 0.5 S/cm at 800° C.

The inorganic oxide powder is the same as the above-described inorganic oxide powder.

According to an exemplary embodiment of the present specification, the electrolyte may include the inorganic oxide powder.

According to an exemplary embodiment of the present specification, the electrolyte may include a sintered body in which the inorganic oxide powder is crystallized. Specifically, the electrolyte according to an exemplary embodiment of the present specification may be produced by sintering the inorganic oxide powder.

According to an exemplary embodiment of the present specification, the content of the sintered body may be 5 wt % to 100 wt % based on the total weight of the electrolyte. Specifically, according to an exemplary embodiment of the present specification, the content of the sintered body may be 70 wt % to 100 wt % based on the total weight of the electrolyte. More specifically, according to an exemplary embodiment of the present specification, the electrolyte may be composed of the sintered body, and may include an additive.

According to an exemplary embodiment of the present specification, an electrolyte membrane for the fuel cell may have a porosity of 0% to 20%.

The porosity indicates the compactness of the electrolyte, and may mean that the smaller the porosity is, the higher the compactness of the electrolyte membrane. Specifically, the porosity may mean the volume % of empty spaces in the total volume of the electrolyte. Further, the compactness may be a value obtained by subtracting the porosity from the total volume of the electrolyte.

According to an exemplary embodiment of the present specification, the first inorganic oxide particle is a zirconia-based compound, and the sintering temperature of the inorganic oxide powder at which the electrolyte has a porosity of 20% or less may be 1,100° C. to 1,300° C. According to an exemplary embodiment of the present specification, the first inorganic oxide particle is a zirconia-based compound, and the sintering temperature of the inorganic oxide may be lower than 50° C. or more.

According to an exemplary embodiment of the present specification, the first inorganic oxide particle is a ceria-based compound, and the sintering temperature of the inorganic oxide powder at which the electrolyte has a porosity of 20% or less may be 1,300° C. to 1,500° C. According to an exemplary embodiment of the present specification, the first inorganic oxide particle is a ceria-based compound, and the sintering temperature of the inorganic oxide may be lower than 50° C. or more.

According to an exemplary embodiment of the present specification, the first inorganic oxide particle is a bismuth-based compound, and the sintering temperature of the inorganic oxide powder at which the electrolyte has a porosity of 20% or less may be 1,200° C. to 1,400° C. According to an exemplary embodiment of the present specification, the first inorganic oxide particle is a bismuth-based compound, and the sintering temperature of the inorganic oxide may be lower than 50° C. or more.

According to an exemplary embodiment of the present specification, the first inorganic oxide particle is a lanthanum gallate-based compound, and the sintering temperature of the inorganic oxide powder at which the electrolyte has a porosity of 20% or less may be 1,200° C. to 1,400° C. According to an exemplary embodiment of the present specification, the first inorganic oxide particle is a lanthanum gallate-based compound, and the sintering temperature of the inorganic oxide may be lower than 50° C. or more.

According to an exemplary embodiment of the present specification, the first inorganic oxide particle and the second inorganic oxide particle may include the same compound or different compounds.

According to an exemplary embodiment of the present specification, the first and second inorganic oxide particles may be a zirconia-based compound.

According to an exemplary embodiment of the present specification, the first and second inorganic oxide particles may be a ceria-based compound.

According to an exemplary embodiment of the present specification, the first and second inorganic oxide particles may be a bismuth-based compound.

According to an exemplary embodiment of the present specification, the first and second inorganic oxide particles may be a lanthanum gallate-based compound.

According to an exemplary embodiment of the present specification, the sintering temperature of the sintered body may be 70% to 95% of the sintering temperature of the first inorganic oxide particle.

The "sintering temperature" means a temperature at which the porosity of the sintered body of the inorganic oxide powder may be 20% or less by subjecting the inorganic oxide powder to heat treatment. Specifically, the electrolyte according to an exemplary embodiment of the present specification may include the sintered body, and the porosity of the electrolyte may be the same as the porosity of the sintered body.

According to an exemplary embodiment of the present specification, the electrolyte may be an electrolyte for a solid oxide fuel cell.

An exemplary embodiment of the present specification provides a solid oxide fuel cell including: an air electrode; a fuel electrode; and the electrolyte provided between the air electrode and the fuel electrode.

According to an exemplary embodiment of the present specification, the solid oxide fuel cell may be formed by simultaneously sintering the air electrode, the fuel electrode, and the electrolyte.

As described above, since the electrolyte has a low sintering temperature, it is possible to simplify the heat treatment process through simultaneous sintering with other constituents such as the electrode during the production of the solid oxide fuel cell. Therefore, the solid oxide fuel cell according to an exemplary embodiment of the present specification may significantly lower the process costs compared to the case where each constituent is separately sintered, and then adhered, and has an advantage in that the adhesion strength at the interface between the constituents is excellent.

In general, in the case of a solid oxide fuel cell, an anode or a cathode is formed, and then an electrolyte is formed on the anode or the cathode, and the sintering temperature of the electrolyte becomes higher than that of the anode or the cathode, so that an anode or a cathode, which requires a porous structure, is sintered at a temperature higher than necessary, and thus, the anode or the cathode becomes compact. That is, in the case of a typical solid oxide fuel cell, when an electrolyte having a compact structure is formed, deterioration in performance of the anode or the cathode is accompanied.

In contrast, the solid oxide fuel cell according to an exemplary embodiment of the present specification includes an electrolyte which forms a compact structure at a low sintering temperature, and thus may include an electrolyte having a compact structure without deterioration in performance of the anode or the cathode because the inorganic oxide powder may be simultaneously sintered with the anode and the cathode.

According to an exemplary embodiment of the present specification, the type of solid oxide fuel cell may be a tubular, flat tubular, or planar type.

According to an exemplary embodiment of the present specification, the solid oxide fuel cell may be a unit cell.

Furthermore, according to an exemplary embodiment of the present specification, provided is a solid oxide fuel cell module including: a stack including an interconnector which connects the two or more unit cells; a fuel supply unit supplying fuel to the stack; an air supply unit supplying air to the stack.

According to an exemplary embodiment of the present specification, the solid oxide fuel cell of the present specification may be used in the same manner as in the unit cell.

According to an exemplary embodiment of the present specification, the fuel electrode may include an anode support layer (ASL) and an anode functional layer (AFL). The AFL may be a porous membrane, and the membrane may be provided between an ASL and an electrolyte membrane. More specifically, the ASL may be a region in which the electrochemical reactions occur while being brought in contact with the electrolyte membrane.

According to an exemplary embodiment of the present specification, the ASL serves as a support layer of the fuel electrode, and may be formed to have a relatively larger thickness than that of the AFL for this purpose. In addition, the ASL may be formed such that fuel smoothly reaches the AFL, and the electrical conductivity is excellent.

According to an exemplary embodiment of the present specification, the air electrode may include a cathode support layer (CSL) and a cathode functional layer (CFL).

According to an exemplary embodiment of the present specification, the CFL may be a porous membrane, and the membrane may be provided between a CSL and an electrolyte. More specifically, the CSL may be a region in which the electrochemical reactions occur while being brought in contact with the electrolyte membrane.

According to an exemplary embodiment of the present specification, the CSL serves as a support layer of the air electrode, and may be formed to have a relatively larger thickness than that of the CFL for this purpose. In addition, the CSL may be formed such that air smoothly reaches the CFL, and the electrical conductivity is excellent.

According to an exemplary embodiment of the present specification, the interconnector may include a fuel channel through which fuel may move to each unit cell and an air channel through which air may move to each unit cell.

According to an exemplary embodiment of the present specification, the stack may be a stack of two or more unit cells. In addition, the interconnector may include a fuel channel and an air channel connecting each unit cell.

According to an exemplary embodiment of the present specification, in the stack, each unit cell is stacked in series, and a separator which electrically connects the unit cells may be further provided between the unit cells.

An exemplary embodiment of the present specification provides a method for producing the inorganic oxide powder, the method including: forming a first inorganic oxide particle; preparing a second inorganic oxide particle; and forming one or more ion conductive particles by binding the second inorganic oxide particle to the first inorganic oxide particle.

According to an exemplary embodiment of the present specification, the forming of the first inorganic oxide particle may include subjecting one or more compounds selected from the group consisting of zirconia-based compounds; ceria-based compounds; bismuth-based compounds; and lanthanum gallate-based compounds to heat treatment by using a flux, and then filtering particles having a particle diameter of 200 nm or more.

According to an exemplary embodiment of the present specification, the forming of the ion conductive particles may be performed by using a solid-state reaction method, a thermal decomposition method, or an oxidation-reduction method.

Hereinafter, the present specification will be described in detail with reference to Examples for specifically describing the present specification. However, the Examples according to the present specification may be modified in various forms, and it is not interpreted that the scope of the present specification is not limited to the Examples described below in detail. The Examples of the present specification are provided for more completely explaining the present specification to a person with ordinary skill in the art.

EXAMPLE 1

The effects of temperature on the size of particles were observed by using HAS (a commercially available gallate doped ceria (GDC) powder manufactured by Rhodia Inc.) as a starting material.

For the GDC powder itself, the particle size is increased as the temperature is increased, but it was not able to obtain particles having a particle diameter of 1 μm or more even though the heat treatment was performed by increasing the temperature. Therefore, the size of particles was further increased by using a flux. A flux such as $H_3BO_3$, $NH_4Cl$, NaCl, and ZnCl was used, and it was able to obtain GDC particles exhibiting a size of 11 μm or more through this. A first inorganic oxide particle was obtained by dispersing the thus grown powder using a ball mill, and then filtering only particles having a size of 1 μm or more through the classification.

Furthermore, a solution was prepared by using cerium and gadolinium in the form of nitrate, and then was mixed with the first inorganic oxide particle well dispersed, and then the pH was adjusted to 9 to perform the co-precipitation such that the GDC particles of the nanosize were bonded to the surface of the first inorganic oxide particle, thereby producing an inorganic oxide powder.

FIGS. 2 and 3 illustrate an image of inorganic oxide particles produced according to Example 1.

EXAMPLE 2

An electrolyte was produced by sintering the inorganic oxide particle produced as in the same manner as in Example 1 at a temperature of 1,350° C. The compactness of the electrolyte produced according to Example 2 could be measured by using the porosity, and the porosity measured was found to be 19.9%. Therefore, the electrolyte according to Example 2 was shown to have an excellent compactness of 80.1%.

FIG. 4 illustrates an image of an electrolyte produced according to Example 2.

EXAMPLE 3

An electrolyte was produced in the same manner as in Example 2, except that sintering was performed at a temperature of 1,450° C. The compactness of the electrolyte according to Example 3 amounted to 99%.

FIG. 5 illustrates an image of an electrolyte produced according to Example 3.

COMPARATIVE EXAMPLE 1

An electrolyte was produced by using GDC particles which were not processed to perform sintering at 1,350° C. as in Example 2. The compactness of the electrolyte according to Comparative Example 1 was found to be 65.1%.

FIG. 6 illustrates an image of an electrolyte produced according to Comparative Example 1.

COMPARATIVE EXAMPLE 2

An electrolyte was produced by using GDC particles which were not processed to perform sintering at 1,450° C. as in Example 3. The compactness of the electrolyte according to Comparative Example 1 was found to be 70.1%.

FIG. 7 illustrates an image of an electrolyte produced according to Comparative Example 2.

As can be seen through Examples 2 and 3 and Comparative Examples 1 and 2, it can be seen that the electrolyte produced according to an exemplary embodiment of the present specification exhibited high compactness at a low temperature, and this means that excellent performance can be exhibited when the electrolyte is used as an electrolyte of a solid oxide fuel cell. Specifically, the Examples and the Comparative Examples exhibit that the sintering temperature of the electrolyte of the present specification is lowered.

The invention claimed is:
1. An electrolyte comprising a sintered body of an inorganic oxide powder, the inorganic oxide powder comprising one or more ion conductive particles, the ion conductive particles including:
   a first inorganic oxide particle; and
   at least one second inorganic oxide particle bonded to a surface of the first inorganic oxide particle,
   wherein a particle diameter of the second inorganic oxide particle is 1/10,000 to 1/2 of a particle diameter of the first inorganic oxide particle,
   wherein the first inorganic oxide particle and the second inorganic oxide particle each have an oxygen ion conductivity of 0.0001 S/cm to 0.5 S/cm at 800° C., wherein the first inorganic oxide particle and the second inorganic oxide particle comprise the same ceria-based compound, and wherein a sintering temperature of the inorganic oxide powder at which the electrolyte has a porosity of 20% or less is 1,300° C. to 1,500° C.

2. The electrolyte of claim 1, wherein the first inorganic oxide particles have an average particle diameter of 200 nm to 20 μm, and the second inorganic oxide particles have an average particle diameter of 1 nm to 500 nm.

3. The electrolyte of claim 1, wherein a weight ratio of the first inorganic oxide particle and the second inorganic oxide particle in the inorganic oxide powder is 1,000:1 to 1:10.

4. The electrolyte of claim 1, wherein the electrolyte has a porosity of 0% to 20%.

5. The electrolyte of claim 1, wherein a sintering temperature of the sintered body is 70% to 95% of a sintering temperature of the first inorganic oxide particle.

6. The electrolyte of claim 1, wherein a content of the sintered body is 5 wt % to 100 wt % based on a total weight of the electrolyte.

7. The electrolyte of claim 1, wherein the electrolyte is an electrolyte for a solid oxide fuel cell.

8. A solid oxide fuel cell comprising:
an air electrode; a fuel electrode; and
the electrolyte of claim 1 provided between the air electrode and the fuel electrode.

9. The solid oxide fuel cell of claim 8, wherein the solid oxide fuel cell is formed by simultaneously sintering the air electrode, the fuel electrode, and the electrolyte.

10. A method for producing the electrolyte of claim 1, the method comprising:
forming the first inorganic oxide particle;
preparing the second inorganic oxide particles; and
forming the one or more ion conductive particles by binding the second inorganic oxide particle to the first inorganic oxide particle.

11. The method of claim 10, wherein the forming of the first inorganic oxide particle comprises subjecting the ceria-based compound and one or more compounds selected from the group consisting of zirconia-based compounds; other ceria-based compounds; bismuth-based compounds; and lanthanum gallate-based compounds to heat treatment by using a flux, and then filtering particles having a particle diameter of 200 nm or more.

12. The method of claim 10, wherein the forming of the ion conductive particle is performed by using a solid-state reaction method, a thermal decomposition method, or an oxidation-reduction method.

* * * * *